(12) United States Patent
Boddapati et al.

(10) Patent No.: US 8,576,702 B2
(45) Date of Patent: Nov. 5, 2013

(54) RECEIVING MULTICAST TRAFFIC AT NON-DESIGNATED ROUTERS

(75) Inventors: Suresh Boddapati, Union City, CA (US); Venugopal V. Hemige, Union City, CA (US); Jayant Kotalwar, Sunnyvale, CA (US)

(73) Assignee: Alcatel Lucent, Paris (FR)

( * ) Notice: Subject to any disclaimer, the term of this patent is extended or adjusted under 35 U.S.C. 154(b) by 497 days.

(21) Appl. No.: 11/710,136

(22) Filed: Feb. 23, 2007

(65) Prior Publication Data

US 2008/0205395 A1  Aug. 28, 2008

(51) Int. Cl.
*G01R 31/08* (2006.01)
*H04L 12/26* (2006.01)
*H04L 12/28* (2006.01)
*H04L 12/56* (2011.01)

(52) U.S. Cl.
USPC .......... 370/219; 370/230; 370/252; 370/254; 370/389

(58) Field of Classification Search
None
See application file for complete search history.

(56) References Cited

U.S. PATENT DOCUMENTS

| | | | |
|---|---|---|---|
| 6,385,647 B1* | 5/2002 | Willis et al. ................... 709/217 |
| 6,751,191 B1* | 6/2004 | Kanekar et al. ............... 370/217 |
| 7,227,838 B1* | 6/2007 | O'Riordan .................... 370/219 |
| 7,639,680 B1* | 12/2009 | Roy et al. ...................... 370/389 |
| 2003/0193958 A1* | 10/2003 | Narayanan .................... 370/400 |
| 2005/0025179 A1* | 2/2005 | McLaggan et al. ........... 370/468 |
| 2005/0177762 A1* | 8/2005 | Singh et al. ...................... 714/4 |
| 2005/0281191 A1* | 12/2005 | McGee et al. ................. 370/216 |
| 2006/0176804 A1* | 8/2006 | Shibata ......................... 370/217 |
| 2006/0182049 A1 | 8/2006 | Rokui |
| 2007/0058627 A1* | 3/2007 | Smith et al. ................... 370/390 |
| 2007/0101379 A1* | 5/2007 | Pereira ............................. 725/90 |
| 2007/0177593 A1* | 8/2007 | Kompella ..................... 370/390 |
| 2007/0230472 A1* | 10/2007 | Jesuraj .......................... 370/392 |
| 2007/0239879 A1* | 10/2007 | Serbest et al. ................ 709/230 |

FOREIGN PATENT DOCUMENTS

WO    WO 0069119    11/2000

\* cited by examiner

*Primary Examiner* — Chirag Shah
*Assistant Examiner* — Ashley Shivers
(74) *Attorney, Agent, or Firm* — Van Pelt, Yi & James, LLP

(57) ABSTRACT

A multicast stream is received. At a non-designated router, a multicast stream is received with respect to which the non-designated router is not a designated router responsible for sending the multicast stream to a host. The received multicast stream is discarded.

26 Claims, 7 Drawing Sheets

RECEIVING MULTICAST TRAFFIC AT NON-DESIGNATED ROUTERS

BACKGROUND OF THE INVENTION

Protocol independent multicast-sparse-mode (PIM-SM) is a protocol associated with forwarding of multicast traffic. In PIM-SM, the designated router (DR) is responsible for forwarding multicast traffic to a host on a local area network (LAN) that requested or otherwise desires multicast traffic. Occasionally, a designated router will fail. In some applications, failure of the designated router is undesirable because some amount of multicast traffic is lost while the network recovers (e.g., a few seconds). In some cases, the multicast traffic includes audio/video and a listener/viewer notices a glitch. Techniques to recover in a shorter amount of time in the event a designated router fails would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Receiving a multicast stream is disclosed. In some embodiments, a protocol for routing to a multicast group is used between routers, such as Protocol Independent Multicast-Sparse Mode (PIM-SM). A request is sent by a host to receive a multicast stream on a LAN. The request is seen by all routers on the LAN. One of the routers on the LAN is elected as a designated router. The designated router is responsible for providing multicast traffic to a host. A non-designated router is a router other than a designated router. What is disclosed is receiving a multicast stream at a non-designated router. In some embodiments, a protocol for routing to a multicast group is used, such as protocol independent multicast-sparse-mode (PIM-SM). The received multicast stream is discarded. In some embodiments, the process further includes sending the multicast stream to the host in the event the designated router fails. In some embodiments, the process further includes determining whether to receive the multicast stream.

Figure 1:
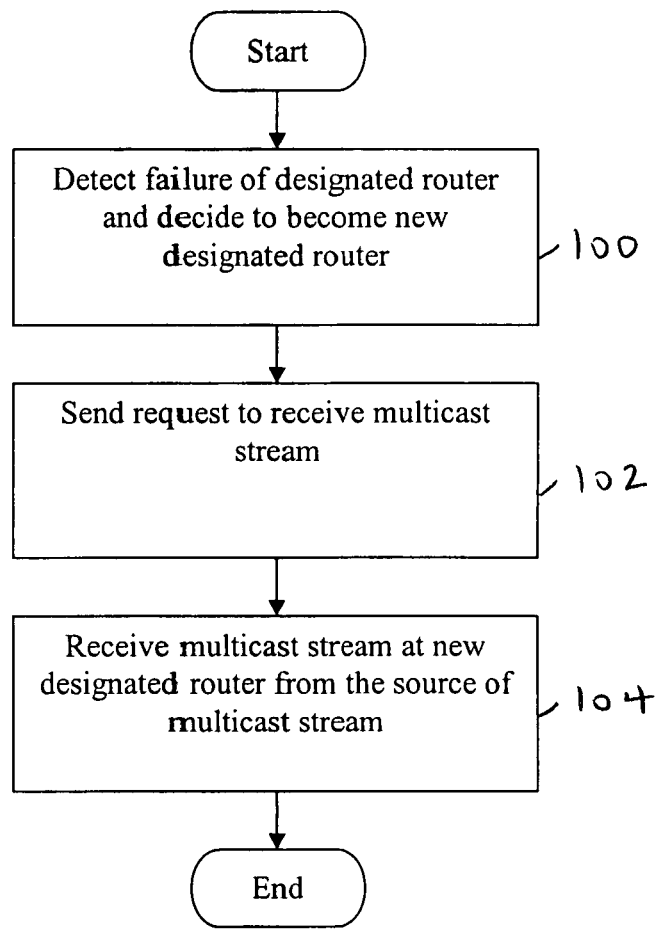
FIG. 1 is a flowchart illustrating an example of an existing technique for handling the failure of a designated router.

FIG. 1 is a flowchart illustrating an example of an existing technique for handling the failure of a designated router. In the example shown, the process is performed by a non-designated router, and the designated router and non-designated router are configured to support protocol independent multicast-sparse-mode (PIM-SM). In PIM-SM, the designated router is responsible for forwarding multicast traffic on a local area network (LAN).

At 100, the failure of a designated router is detected and it is decided to become the new designated router. For example, a designated router and a non-designated router periodically exchange hello messages. A non-designated router has a timer and determines that the designated router has failed if a hello message is not received from the designated router before the timer expires. In some cases, there is more than one non-designated router, and there is a process for determining which non-designated router becomes the new designated router. In some embodiments, hello messages are used to exchange priority values and the non-designated router with the highest priority value becomes the new designated router.

At 102, a request is sent to receive a multicast stream. In this example, PIM-SM is supported and PIM Join messages are used. A PIM Join message is passed upstream (via any number of intermediary nodes or routers) from the new designated router towards the source of the particular multicast stream. As used herein, downstream refers to the direction towards a requesting host and away from the source of a given multicast stream; downstream refers to the reverse direction. As used herein, a stream refers to a logical or associated group of information being carried over the network (e.g., from a particular source to a particular group/multicast address); traffic refers in general to information that is carrier over a network. For example, multicast traffic may comprise content associated with Internet protocol television (IPTV); one multicast stream is associated with content from one television channel and another multicast stream is associated with content from another television channel.

At 104, the multicast stream is received at the new designated router from the source of the multicast stream. The new designated router forwards the received multicast stream to the requesting host on the LAN.

The amount of time to recover from a designated router failure in this example is equal to the sum of the failure detection time (i.e., step 100), the time for the request to be sent upstream (i.e., step 102), and the time for the multicast stream to be received at the host (i.e., step 104). In some cases, the recovery time is on the order of several seconds and it would be desirable if the recovery time could be reduced.

Figure 2:
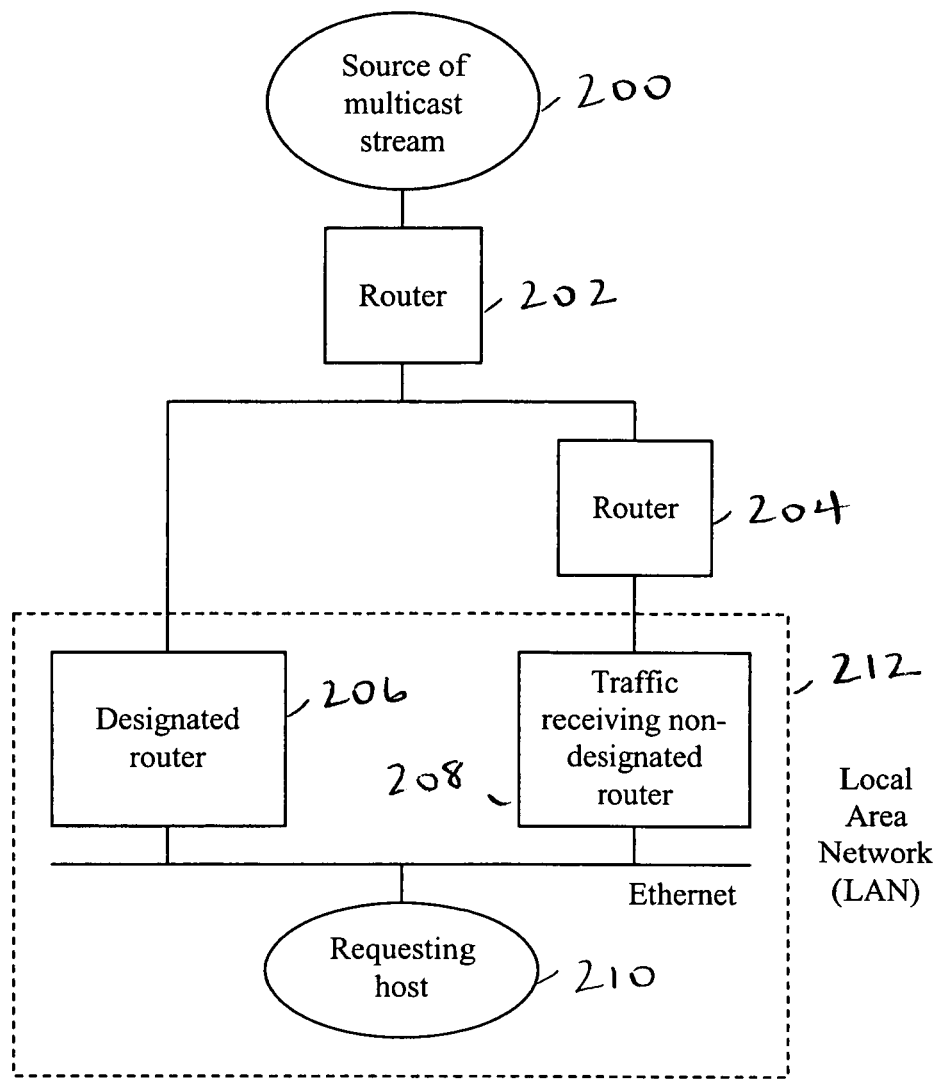
FIG. 2 is a diagram illustrating an embodiment of a network that includes a non-designated router configured to received, but not forward to a downstream host, multicast traffic to which the downstream host has subscribed.

FIG. 2 is a diagram illustrating an embodiment of a network that includes a non-designated router configured to receive, but not forward to a downstream host, multicast traffic to which the downstream host has subscribed. In the example shown, requesting host 210 requests a multicast stream that is generated by source 200. LAN 212 includes designated router 206, traffic receiving non-designated router 208, and requesting host 210. The devices in LAN 212 are connected using an Ethernet connection. In some embodiments, some other type of broadcast connection is used besides an Ethernet connection. Designated router 206 is connected to router 202. Traffic receiving non-designated router 208 is connected to router 204, which in turn is connected to router 202. Router 202 is connected to source 200. In some embodiments, a network varies from the example shown herein (e.g., different topology, components, types of connections, etc.).

In some embodiments, PIM-SM and Internet Group Management Protocol (IGMP) are used. For example, designated router 206, traffic receiving non-designated router 208, and requesting host 210 use IGMP to manage the example multicast group. Routers 202, 204, 206, and 208 use PIM-SM to perform routing for the example multicast group. In various embodiments, one or more protocols besides and/or in addition to PIM-SM and/or IGMP are used.

In this example, designated router 206 is responsible for forwarding the multicast stream on LAN 212. For example, after determining that it should be the designated router, a PIM Join is sent upstream by designated router 206. To properly forward or route the PIM Join message, designated router 206 may consult a routing table and send the PIM Join message to router 202. Upon receiving the PIM Join message, router 202 may consult its own routing table and forward the PIM Join message to source 200. The desired multicast stream is sent from source 200 to requesting host 210 via router 202 and designated router 206. In some cases (e.g., where router 202 has other hosts on other interfaces which have already requested the multicast stream), router 202 may already be receiving the desired multicast stream and router 202 in such cases may simply forward the multicast stream to designated router 206 without forwarding on the PIM Join to source 200.

Traffic receiving non-designated router 208 is configured to attract multicast streams requested by the LAN even though it is a non-designated router. In some embodiments, traffic receiving non-designated router 208 uses the same type of message as designated router 206 to indicate or otherwise signal to source 200 that it desires a particular multicast stream. For example, traffic receiving non-designated router 208 may send a PIM Join message to source 200 via routers 204 and 202. Router 202, 204, and 208 may each consult routing tables to determine the next node or router to send a PIM Join message to. After receiving the PIM Join message, the multicast stream is sent from source 200 to traffic receiving non-designated router 208. In some cases, an intervening router between source 200 and traffic receiving non-designated router 208 (i.e., router 202 or 204) is already receiving the desired multicast stream and sends the multicast stream downstream without sending the PIM Join message further upstream.

Although traffic receiving non-designated router 208 receives the multicast stream, it does not forward it to requesting host 210 via the Ethernet connection. In some embodiments, traffic receiving non-designated router 208 forwards a received multicast stream only if it determines that designated router 206 has failed and if router 208 is elected as the designated router. An embodiment of determining that a designated router has failed is described in further detail below.

When using a traffic receiving non-designated router, the recovery time is equal to the amount of time to detect a failure (e.g., instead of the sum of the failure detection time, the time to send a request upstream, and the time for the multicast stream to begin being received at the newly determined designated router, as in the process of FIG. 1). In some applications, a faster recovery time in the event of a designated router failure is desirable. In some embodiments, the multicast stream includes "live" content. For example, the multicast stream may be IPTV data of a sports game. In these and other scenarios, reducing the recovery time is desirable.

In some embodiments, the techniques disclosed herein are combined or supplemented with other techniques to achieve further improvements. For example, a process or mechanism that is capable of detecting the failure of a designated router within a relatively short time (e.g., on the order of milliseconds) may be attractive. In some embodiments, bidirectional forwarding detection (BFD) is used. When such embodiments are used, the failure detection time is significantly reduced and the recovery time is in the order of milliseconds.

In some embodiments, LAN 212 includes additional non-designated routers. In various embodiments, whether or not these additional non-designated routers also receive multicast traffic is handled in a variety of ways. In some embodiments, routers are hard-coded or fixed and all non-designated routers are configured to receive multicast traffic. In some embodiments, there is some parameter or variable by which each router is able to be individually configured to receive multicast traffic or not.

In some embodiments, determination of which non-designated routers receive multicast traffic is based on network topography and/or traffic load. For example, if a network has relatively little traffic, there may be little or no drawback to having all non-designated routers receive multicast traffic. As an example of how network topography may be considered in such a decision, in some embodiments, if a path or route associated with a given non-designated router overlaps more than a certain number of hops (or some other unit of measurement) with a path or router associated with the designated router, that non-designated router receives a multicast stream.

In some embodiments, a setting for a particular non-designated router to receive traffic is set manually. For example, the topography of some networks change infrequently and a network administrator configures newly installed non-designated routers to receive multicast traffic or not. In some embodiments, remote access to configure such a setting is available. For example, a network administrator who manages a network distributed over a large geographical area (e.g., a company with offices in many locations) may desire the ability to remotely access a particular non-designated router and turn off/on reception of a multicast stream for that router (e.g., in response to a change in network topology and/or traffic load). In some embodiments, a setting for a particular non-designated router to receive traffic is set automatically. For example, a non-designated router may build a partial or complete map of the network and/or monitor traffic and configure itself to receive a multicast stream or not accordingly.

Although some of the examples described herein show a single multicast stream, in some embodiments there are multiple multicast streams. In various embodiments, a given source generates two or more multicast streams, a given traffic receiving non-designated router receives two or more multicast streams, and/or a given host receives or more multicast traffic streams. The techniques disclosed herein may be modified as appropriate to accommodate two or more multicast streams.

Figure 3:
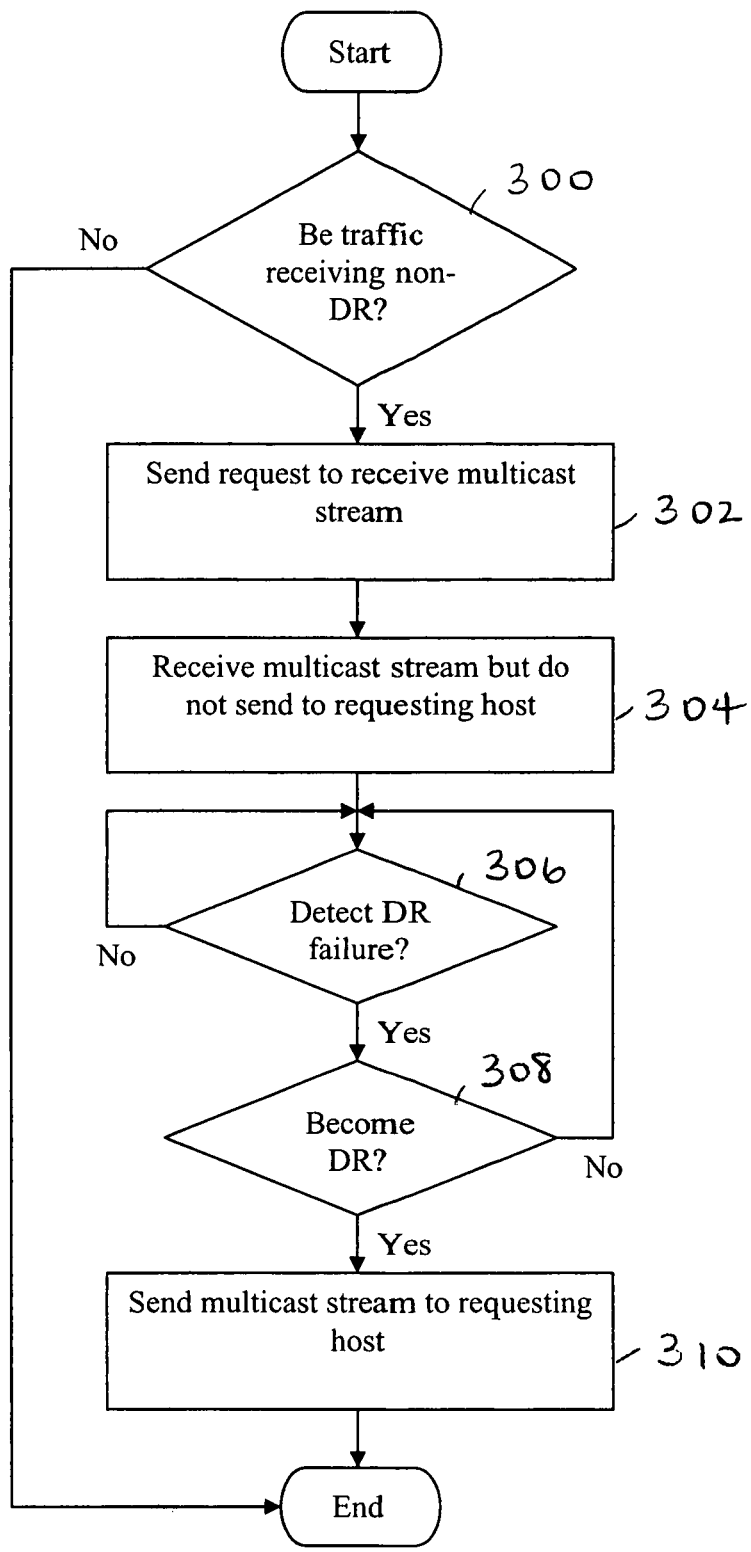
FIG. 3 is a flowchart illustrating an embodiment of a process for recovering from a designated router failure using a non-designated router that has been configured to receive while in the non-designated state one or more multicast streams.

FIG. 3 is a flowchart illustrating an embodiment of a process for recovering from a designated router failure using a non-designated router that has been configured to receive while in the non-designated state one or more multicast streams. In some embodiments, the process of FIG. 3 is performed by traffic receiving non-designated router 208 of FIG. 2.

At 300, it is determined whether to become a traffic receiving non-designated router. In some embodiments, a register or Boolean variable is consulted or accessed in making this determination. In some embodiments, non-designated routers are hard-coded to receive multicast traffic. In some embodiments, some subset of non-designated routers receives multicast traffic. If it determined to receive traffic, at 302, a request is sent to receive a multicast stream. For example, traffic receiving non-designated router 208 sends a PIM Join message upstream to source 200 via routers 204 and 202 in FIG. 2. In some embodiments, a message sent at 302 includes a source address (e.g., of source 200) and/or a multicast address associated with the multicast stream. At 304, a multicast stream is received but is not sent to a requesting host. For example, source 200 sends the multicast stream downstream to traffic receiving non-designated router 208 via routers 202 and 204 but traffic receiving non-designated router 208 does not send it out the Ethernet port connected to requesting host 210.

It is determined at 306 if a designated router failure has been detected. In various embodiments, any appropriate failure detection mechanism or technique may be used. In some embodiments, hello messages are exchanged periodically and if a traffic receiving non-designated router does not receive a hello message from a designated router for some period of time, it concludes that the designated router has failed. If no failure is detected, a new failure determination is performed at 306.

If it is determined there is a failure, it is decided at 308 whether to become the designated router. One embodiment is described in further detail below.

If it decided not to become the designated router, a new failure determination is performed at 306. For example, the traffic-receiving non-designated router that becomes the new designated router may fail and another traffic-receiving non-designated router may have to take over as the next designated router. If it is decided to become the designated router, at 310 a multicast stream is sent to a requesting host. The router is already receiving the multicast stream and now forwards it to the requesting host rather than discarding it.

Figure 4:
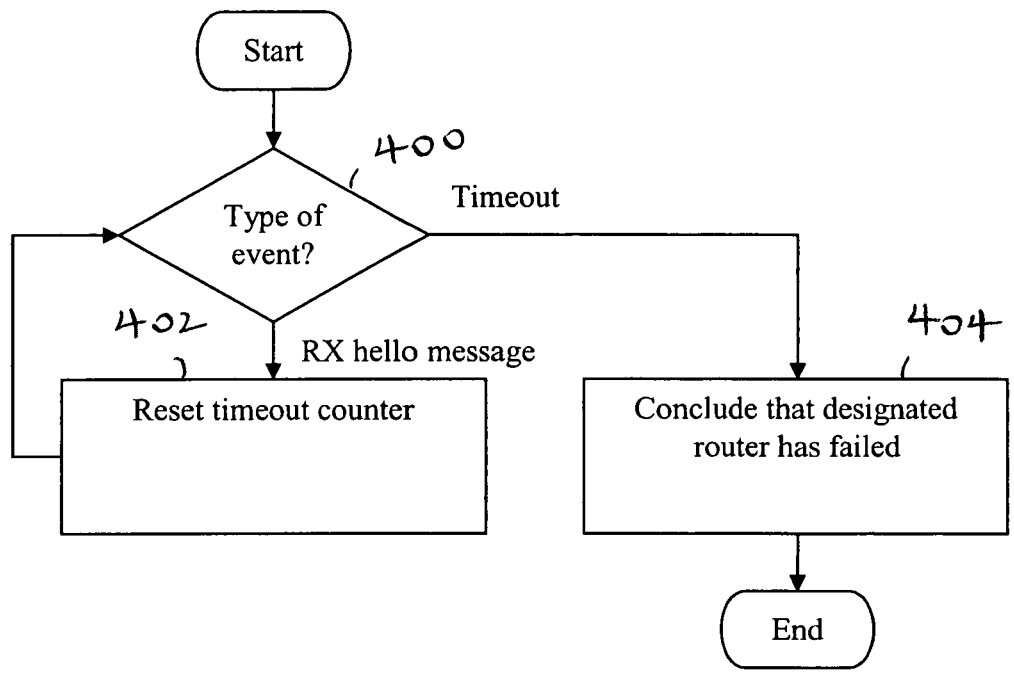
FIG. 4 is a flowchart illustrating an embodiment of a process for detecting the failure of a designated router.

FIG. 4 is a flowchart illustrating an embodiment of a process for detecting the failure of a designated router. In some embodiments, the process is performed by a traffic receiving non-designated router. In some embodiments, the example process is used at step 306 in FIG. 3. In some embodiments, some other process is used for detecting the failure of a designated router.

At 400, the type of event is determined. If a hello message is received, at 402 a timeout counter is reset. In this example, the timeout counter is free running and counts up/down since the last received hello message. If the type of event is a timeout, at 404 it is concluded that the designated router has failed.

Figure 5:
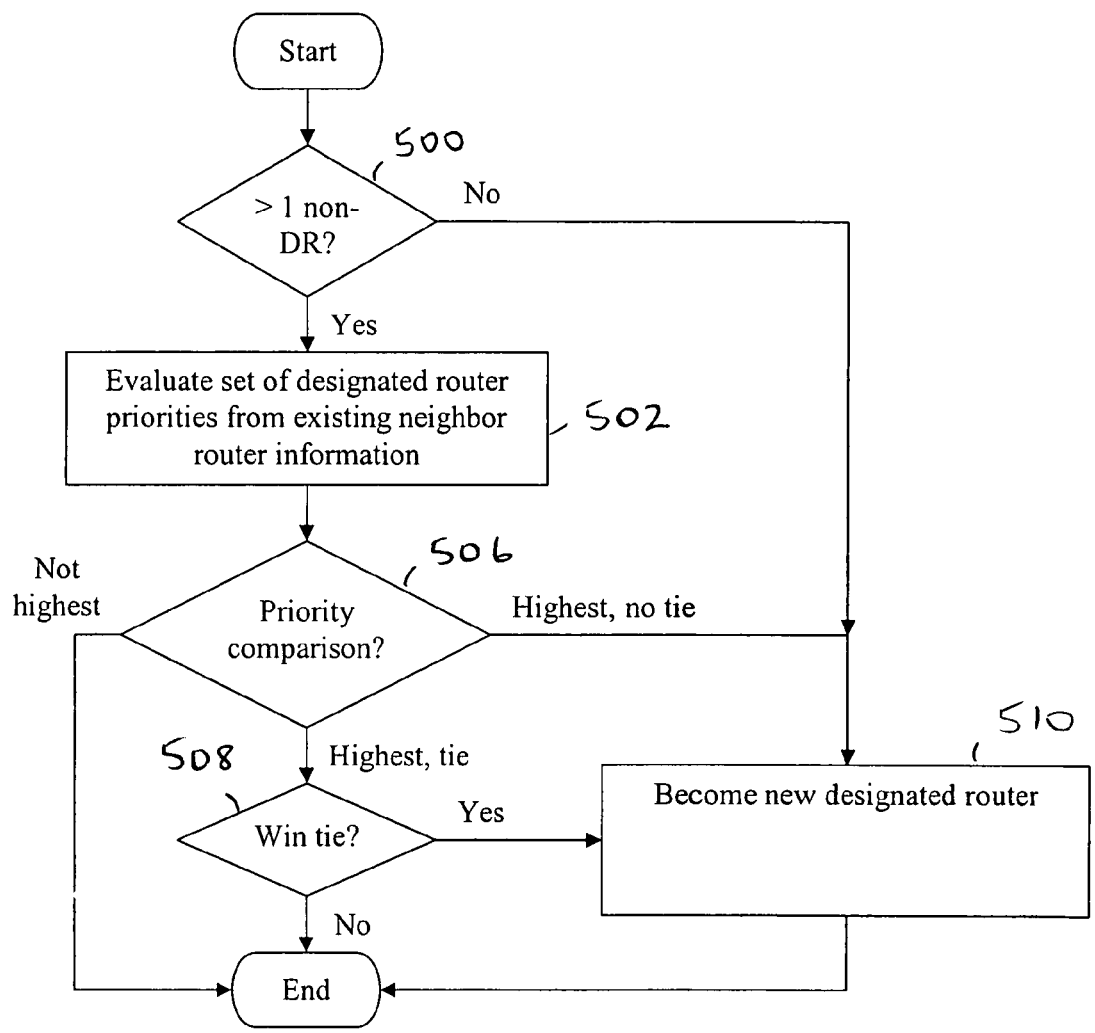
FIG. 5 is a flowchart illustrating an embodiment of a process for determining whether to become a designated router.

FIG. 5 is a flowchart illustrating an embodiment of a process for determining whether to become a designated router. In the example shown, the process is performed by a traffic receiving non-designated router. In some embodiments, the process shown is used at step 308 of FIG. 3. In some embodiments, some other process is used.

At 500, it is determined if there is more than one non-designated router. If there is only one non-designated router, it becomes the new designated router at 510. Otherwise, a set of designated router priorities is evaluated from existing neighbor router information at 502.

At 506, a priority comparison is performed. If the router performing the process does not have the highest priority value, the process ends. If it has the highest priority value and there is a tie, it is determined at 508 if it wins the tie. If so, it becomes the new designated router at 510. If the router has the highest priority value and there is no tie, at 510 it becomes the new designated router.

In some embodiments, steps are taken to ensure that the non-designated router that becomes the new designated router is a traffic receiving one. In some embodiments, priority values are set so that a traffic receiving non-designated router always has the highest priority value. In some applications, it may be difficult to control the priority values. In some embodiments, the non-designated router with the highest priority is configured to receive multicast traffic.

Figure 6:
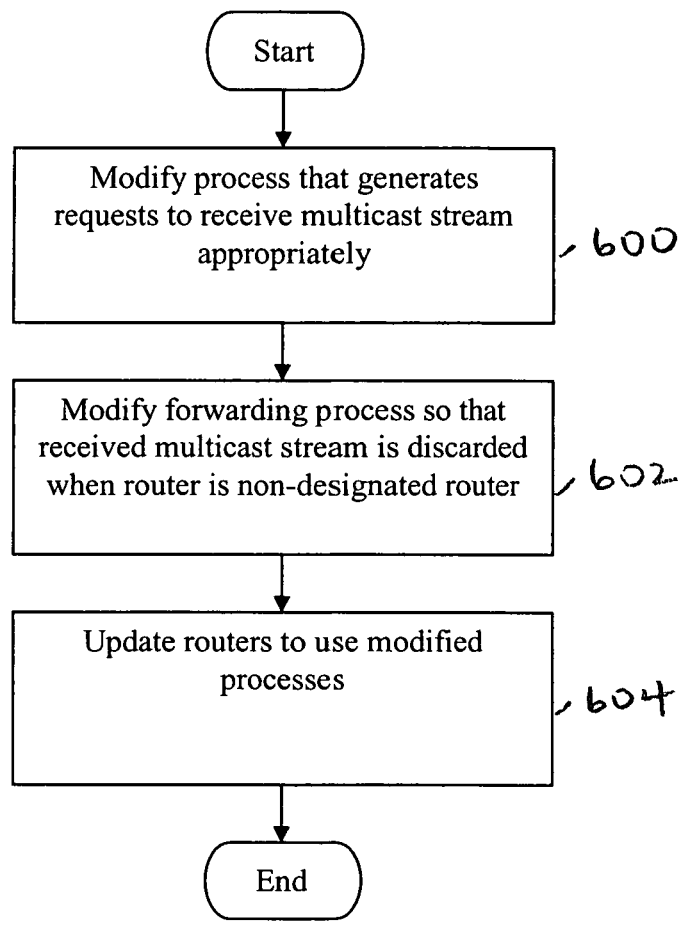
FIG. 6 is a flowchart illustrating an embodiment of a process for modifying an existing process to be able to receive traffic at a non-designated router.

FIG. 6 is a flowchart illustrating an embodiment of a process for modifying an existing process to be able to receive traffic at a non-designated router. In the example shown, an existing process may be implemented in variety of ways, including in hardware (e.g., an application specific integrated circuit (ASIC) or a field programmable gate array (FPGA)) and/or in software (e.g., firmware, macros, executable code, etc.).

At 600, a process that generates requests to receive a multicast stream is modified appropriately. Some existing routers only generate a request to receive multicast traffic when it is the designated router. In some embodiments where a non-designated router always receives multicast traffic, this check is removed. In some embodiments, whether or not a non-designated router receives multicast traffic is configurable. In some embodiments, a process for generating a request to receive a multicast stream is modified to generate such a request based on a register, setting, or Boolean value used to turn on/off reception of a multicast stream.

A forwarding process is modified so that a received multicast stream is discarded when a router is a non-designated router at 602. In some embodiments, a forwarding process is modified to include a check that the router is the designated router, otherwise the received multicast stream is discarded.

At 604, routers are updated to use the modified processes. In some embodiments, firmware or new executable instructions are distributed to the routers and used to update the routers.

Routers are implemented in a variety of ways and in various embodiments different modifications are needed. The modifications described above are merely examples.

Figure 7:
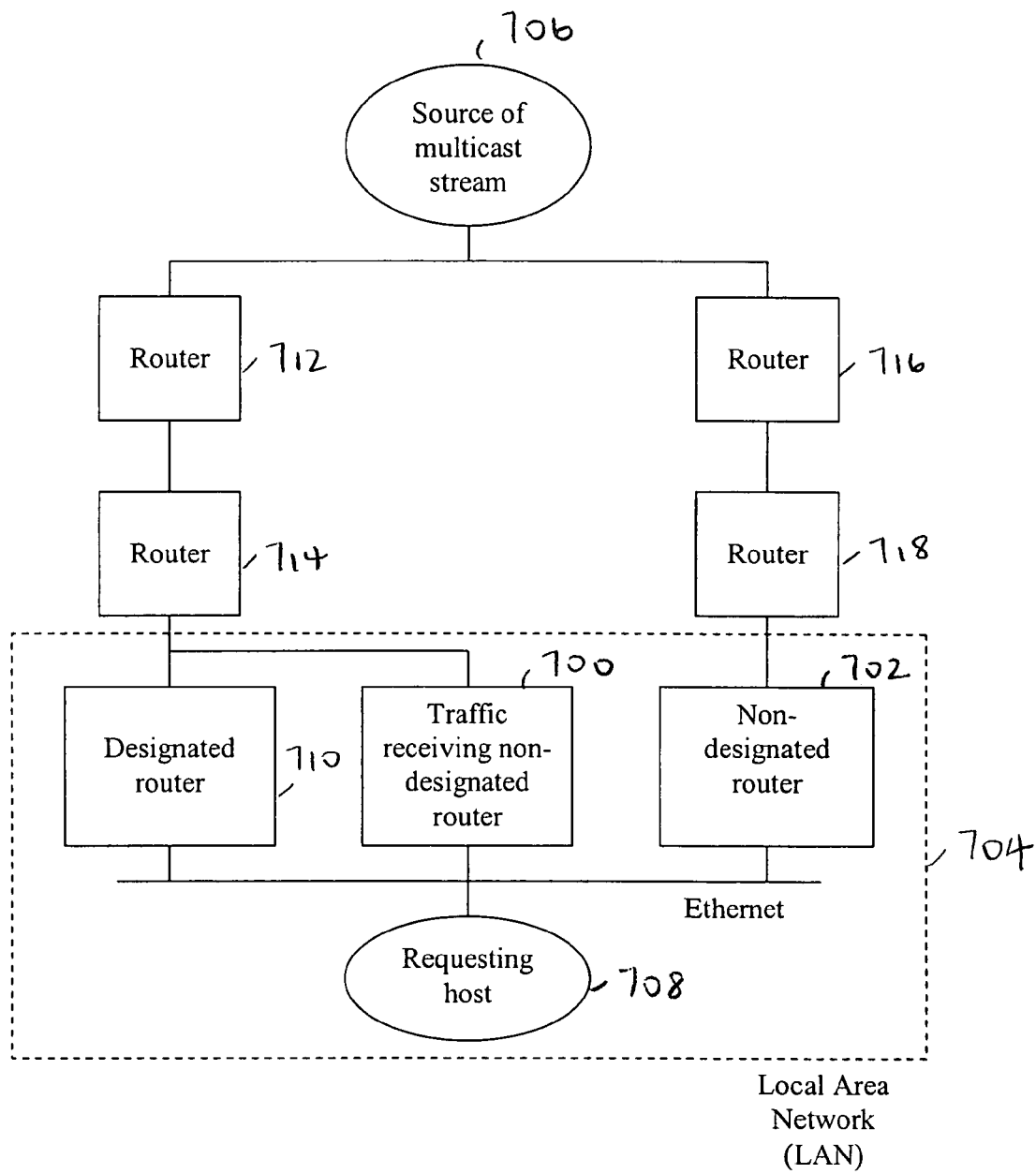
FIG. 7 is a diagram illustrating an embodiment of a network that includes a traffic receiving non-designated router and non-designated router.

FIG. 7 is a diagram illustrating an embodiment of a network that includes a traffic receiving non-designated router and non-designated router. In this example, non-designated router 702 and traffic receiving non-designated router 700 are included in LAN 704. Non-designated router 702 in this example does not receive the multicast stream associated with source 706 that is desired by requesting host 708. In this example, both routers 700 and 702 are capable of receiving the multicast stream from source 706, but non-designated router 702 is configured to not receive traffic because of the topology of the example network. Whereas traffic receiving non-designated router 700 and designated router 710 have relatively similar paths that only differ downstream of router 714, designated router 710 and non-designated router 702 have relatively different paths (e.g., that pass through routers 712 and 714 and routers 716 and 718, respectively). Sending a multicast stream from source 706 through routers 716 and 718 to non-designated router 702 may adversely affect other traffic passing through those routers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for receiving a multicast stream, comprising:
 receiving at a non-designated router a multicast stream sent concurrently from the same source to a designated router and the non-designated router, where the designated router is responsible for sending the multicast stream to a host, where the multicast stream is broadcasted to a multicast internet protocol (IP) address on the network, where the non-designated router and the designated router receive the multicast stream by subscribing to the multicast IP address;
 determining at the non-designated router whether the designated router has failed;
 electing the non-designated router as an elected designated router and sending the received multicast stream to the host from the elected designated router, if it is determined that the designated router has failed, wherein the non-designated router has been elected as the elected designated router from among a plurality of non-designated routers at least in part due to a priority identifier value assigned to the elected designated router and wherein the value is based at least in part on whether the elected designated router has subscribed to the multicast IP address; and
 refraining from sending the received multicast stream to the host and discarding the received multicast stream from the non-designated router, if it is determined that the designated router has not failed.

2. A method as recited in claim 1 further comprising determining whether to receive the multicast stream.

3. A method as recited in claim 1 further comprising determining whether to receive the multicast stream based at least in part on network topology and/or traffic load.

4. A method as recited in claim 1 further comprising detecting a failure of the designated router.

5. A method as recited in claim 1 further comprising detecting a failure of the designated router based at least in part on a timeout.

6. A method as recited in claim 1 further comprising in the event the designated router fails:
 determining whether to send the received multicast stream to the host in the event there are a plurality of non-designated routers receiving the multicast stream; and
 sending the received multicast stream to the host in the event it is determined to do so.

7. A method as recited in claim 1, wherein protocol independent multicast-sparse-mode (PIM-SM) is used.

8. A method as recited in claim 1, wherein Internet Group Management Protocol (IGMP) is used.

9. A method as recited in claim 1, wherein the multicast stream includes data associated with Internet protocol television (IPTV).

10. The method of claim 1, further including:
 determining at the non-designated router whether the designated router has failed based on an interaction between the non-designated router and the designated router.

11. A system for receiving a multicast stream, comprising:
 a designated router configured to:
  receive a multicast stream from a source, where the designated router is responsible for sending the multicast stream to a host and where the multicast stream is broadcasted to a multicast internet protocol (IP) address on the network; and
 a non-designated router configured to:
  receive the multicast stream sent concurrently from the same source where the non-designated router and the designated router receive the multicast stream by subscribing to the multicast IP address;
  determine whether the designated router has failed;
  elect itself as an elected designated router and send the received multicast stream to the host, if it is determined that the designated router has failed, wherein the non-designated router is elected as the elected designated router from among a plurality of non-designated routers at least in part due to a priority identifier value assigned to the elected designated router and wherein the value is based at least in part on whether the elected designated router has subscribed to the multicast IP address; and
  refrain from sending the received multicast stream to the host and discard the received multicast stream, if it is determined that the designated router has not failed.

12. A system as recited in claim 11, wherein the non-designated router is further configured to determine whether to receive the multicast stream.

13. A system as recited in claim 11, wherein the non-designated router is further configured to detect a failure of the designated router.

14. A system as recited in claim 11, wherein in the event the designated router fails the non-designated router is further configured to:
 determine whether to send the received multicast stream to the host in the event there are a plurality of non-designated routers receiving the multicast stream; and
 send the received multicast stream to the host in the event it is determined to do so.

15. The system of claim 11, wherein the non-designated router is further configured to:
 determine at the non-designated router whether the designated router has failed based on an interaction between the non-designated router and the designated router.

16. The system of claim 11, wherein the non-designated router is further configured to determine whether to receive the multicast stream based at least in part on network topology and/or traffic load.

17. The system of claim 11, wherein the non-designated router is further configured to detect a failure of the designated router based at least in part on a timeout.

18. The system of claim 11, wherein protocol independent multicast-sparse-mode (PIM-SM) is used.

19. A computer program product for receiving a multicast stream, the computer program product being embodied in a non-transitory computer readable medium and comprising computer instructions for:

receiving at a non-designated router a multicast stream sent concurrently from the same source to a designated router and the non-designated router, where the designated router is responsible for sending the multicast stream to a host, where the multicast stream is broadcasted to a multicast internet protocol (IP) address on the network, where the non-designated router and the designated router receive the multicast stream by subscribing to the multicast IP address;

determining at the non-designated router whether the designated router has failed;

electing the non-designated router as an elected designated router and sending the received multicast stream to the host from the elected designated router, if it is determined that the designated router has failed, wherein the non-designated router has been elected as the elected designated router from among a plurality of non-designated routers at least in part due to a priority identifier value assigned to the elected designated router and wherein the value is based at least in part on whether the elected designated router has subscribed to the multicast IP address; and refraining from sending the received multicast stream to the host and discarding the received multicast stream from the non-designated router, if it is determined that the designated router has not failed.

20. A computer program product as recited in claim 19, the computer program product further comprising computer instructions for determining whether to receive the multicast stream.

21. A computer program product as recited in claim 19, the computer program product further comprising computer instructions for detecting a failure of the designated router.

22. A computer program product as recited in claim 19, wherein in the event the designated router fails the computer program product further comprises computer instructions for:

determining whether to send the received multicast stream to the host in the event there are a plurality of non-designated routers receiving the multicast stream; and sending the received multicast stream to the host in the event it is determined to do so.

23. The computer program product as recited in claim 19, computer program product further comprises computer instructions for:

determining at the non-designated router whether the designated router has failed based on an interaction between the non-designated router and the designated router.

24. The computer program product as recited in claim 19, further comprising determining whether to receive the multicast stream based at least in part on network topology and/or traffic load.

25. The computer program product as recited in claim 19, further comprising detecting a failure of the designated router based at least in part on a timeout.

26. The computer program product as recited in claim 19, wherein protocol independent multicast-sparse-mode (PIM-SM) is used.

* * * * *